United States Patent Office 3,286,579
Patented Nov. 22, 1966

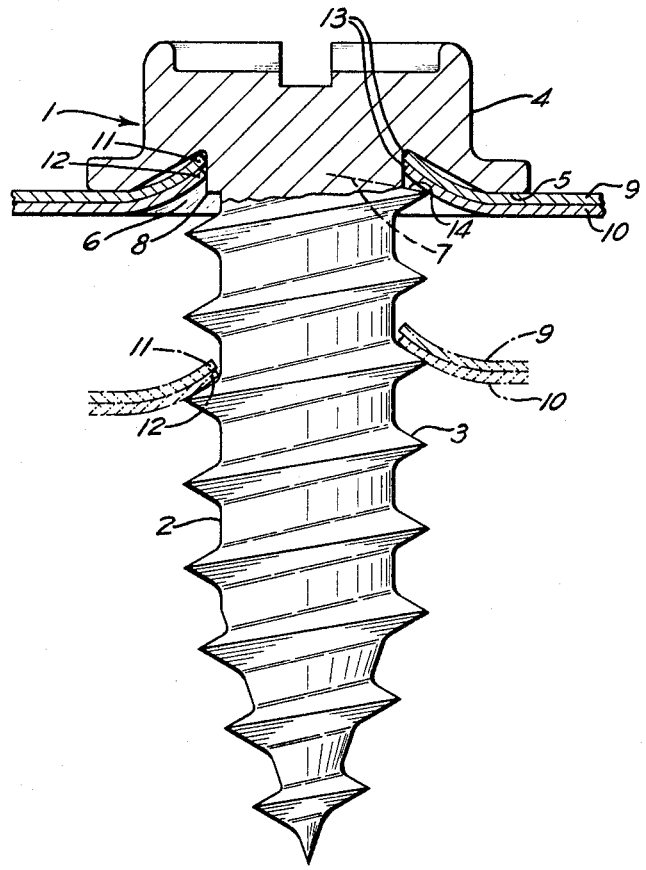

3,286,579
SELF-TAPPING SCREW
Louis J. Lovisek, Cheshire, Conn., assignor to Screw & Bolt Corporation of America, Pittsburgh, Pa., a corporation of Pennsylvania
Filed Nov. 4, 1964, Ser. No. 408,791
6 Claims. (Cl. 85—41)

This invention relates to a self-tapping screw for use in securing together thin metal sheets and has among its objects the provision of a screw that will be held captive by the sheets into which it is threaded, so that it will not be loosened therefrom by rotation due to vibration or other causes. A further object is to provide a screw of this type that will produce an interlocking embossment of the sheets to reduce slippage between the sheets.

The foregoing and other objects will be apparent from the following description of a preferred embodiment of the invention, in connection with the attached drawing, showing an elevation, partly in section, of the screw of this invention in fastening engagement with two thin metal sheets.

Referring to the drawing, there is shown a headed screw fastener 1 of the self-tapping type. It includes the usual shank 2 and thread 3, which may be roll-formed or produced by other suitable means, and a head 4. The underside of the head is provided with an annular bearing area 5 disposed in a plane substantially normal to the axis of the shank and also provided, radially inward of this bearing area and above that plane, with an annular recess or cavity 6. The thread 3 is fully and completely formed on the upper part of the shank as far as its intersection with the plane defined by the annular bearing area, and terminates just above that plane in a nebulous thread form 7.

The recess 6 is sufficiently deep that the unthreaded portion 8 of the shank that is above the plane defined by the annular bearing area 5 will have sufficient axial length to receive the extruded marginal portions of the superimposed thin metal sheets 9 and 10 that are to be fastened together by the screw. These marginal portions 11 and 12, respectively, surround holes 13 in the sheets through which the screw passes. These holes may be drilled in the sheets before the screw is inserted, in which case the hole diameter is desirably equal to or less than the root diameter of the full formed threads; or the holes can be drilled by the screw itself. After the insertion of the screw, these marginal portions 11 and 12 become deformed, as shown in broken lines on the drawing, by engagement with the full screw thread, so that one side of each marginal portion will slightly lead the other side axially of the screw, to form a pseudo-female thread in the sheet. As the screw advances into the sheets, the terminal thread form 14 at and just above the plane of the bearing area 5 will, by its camming or wedging action, extrude these marginal portions into the recess; and continued rotation of the screw, after the bottom sheet has been so extruded, will flatten those marginal portions so that there will be no leading edge or pseudo-female thread to reengage the screw thread 3 when the screw is rotated in the opposite direction. Such flattening of the marginal portions of the sheets is accomplished by the wiping or camming action of the terminal thread form 14 on the underside of the bottom sheet. As a result, the marginal portions of each sheet surrounding the hole through which the screw passes not only will be extruded into the cavity on the underside of the head but also will capture the screw. In other words, the screw will become rotatably affixed to the sheets and incapable of being backed out by rotation in the reverse direction, since there will be no lead in the sheets to pick up the thread.

It is important that the recess 6 on the underside of the head be sufficiently large in a radial direction to permit the metal sheets to be easily extruded into the recess with their marginal portions confined between the bottom of the recess and the full terminal thread on the shank. Since the bearing area 5 acts as a fulcrum for the sheets, the larger the diameter of the recess, the greater will be the effective leverage or camming action of the terminal screw thread for extruding the marginal portions of the sheets into the recess without tearing or undesirably deforming the sheets. Since the screw is rotatably captured by the sheets, it is not necessary that the bearing portion 5 have a large area that will frictionally engage the top sheet and prevent relative rotation between it and the screw. In fact, in many applications it may be desirable to make the bearing area 5 a very narrow annulus and so enhance another feature of this invention, whereby the marginal portions of the sheets extruded into the recess under the head constitute a substantial embossment of the sheets that increases their resistance to relative slippage. In fact, where the thread formed on the shank is deep and the hole in each sheet through which the screw passes is only slightly larger than the bar diameter of the shank, a substantial and desirable locking embossment of the sheets can be obtained. In such case, the area of the annular bearing surface 5 may desirably be less than the projected area of the adjacent recess.

Although this invention has been described and illustrated with both sheets extruded into the recess under the screw head, it will be apparent that by varying the depth of the recess, the unthreaded portion 8 of the shank extending into the recess may be of sufficient length to receive only the top sheet and not the bottom one. In such case, the screw will be rotatably secured to the top sheet only, and the bottom sheet will be held by its engagement with the full threads of the screw.

It will be apparent from the drawing of this invention that the unthreaded portion of the shank that extends between the plane defined by the bearing area 5 and the bottom of the recess 6 has a diameter somewhat greater than the root diameter but less than the crest diameter of the full thread 3. In fact, the diameter of this unthreaded portion 8 is substantially the same as what is known as the pitch diameter of the full thread portion. Since the screw hole in each sheet is properly not appreciably larger than the root diameter of the screw used to fasten it, whether the hole is formed by the screw itself or by a separate drilling operation or by a combination of the two, the sheet or sheets that are fully extruded into the recess under the screw head will be rotatably locked there by the crest portion of the adjacent thread and there will be substantially no play between the sheets and the screw radially of the screw.

It is among the advantages of this invention that a self-tapping screw is rotatably captured by one or both of the metal sheets it fastens together and thereby avoids loosening from vibration or other causes. It is a further advantage that the means for capturing the screw also provides for substantial locking embossment of the sheets.

According to the provisions of the patent statutes, I have explained the principle of my invention and have illustrated and described what I now consider to represent its best embodiment. However, I desire have it understood that, within the scope of the appended claims, the invention may be practiced otherwise than as specifically illustrated and described.

I claim:
1. A self-tapping screw adapted to fasten together two thin metal sheets each provided with a marginal portion surrounding a hole for passage of the screw, said screw comprising an integral head and shank, the underside of the head having an annular bearing area and an annular recess between that area and the shank, a full formed thread on the shank terminating substantially at the transverse plane defined by said bearing area, the unthreaded shank portion extending between the terminal end of the thread and the bottom of the recess being substantially cylindrical and having a diameter less than the crest diameter of the thread but greater than the root diameter of the thread and substantially equal to the pitch diameter thereof, the thread being capable of deforming the marginal portion of at least the top one of the sheets to provide a leading edge therein as the screw is threaded into the sheets and the terminal portion of the thread on continued rotation of the screw being capable of extruding the entire marginal portion of at least the top sheet completely into the recess under the head and to eliminate the lead previously produced on the edge thereof, thereby to capture at least the top sheet with its marginal portion wholly confined between the bottom of the recess and the adjacent terminal end of the thread on the shank.

2. A self-tapping screw in accordance with claim 1, in which the axial distance between the bottom of the recess and the adjacent terminal end of the full thread formed on the shank is at least equal to the combined thickness of both sheets for rotatably capturing the screw by both sheets.

3. A self-tapping screw for fastening together two thin metal sheets each provided with a marginal portion surrounding a hole for the passage of the screw, said screw comprising an integral shank and head, the underside of the head being provided with an annular recess of sufficient axial and radial extent to receive the entire extruded marginal portions of at least the top one of said sheets when fully engaged by the screw, the underside of the head being also provided with an annular bearing face extending radially outward of the recess, and a full thread formed on the shank and extending towards the head as far as the transverse plane determined by said annular bearing surface, the unthreaded portion of the shank between said plane and the bottom of the recess being substantially cylindrical and having a diameter less than the crest diameter of the full thread but greater than the root diameter of the thread and substantially equal to the pitch diameter thereof, whereby rotation of the screw relative to the sheets will extrude the entire marginal portion of at least the top sheet completely into the recessed portion of the head beyond the full thread on the shank to lock the screw rotatably in the top sheet.

4. A self-tapping screw in accordance with claim 3, in which the area of the annular bearing surface on the underside of the head is less than the projected area of the adjacent recess.

5. A self-tapping screw for fastening together two thin metal sheets each provided with a marginal portion surrounding a hole for the passage of the screw, said screw comprising an integral shank and head, the underside of the head being provided with an annular recess of sufficient axial and radial extent to receive the entire extruded marginal portions of both sheets when fully engaged by the screw, the underside of the head being also provided with an annular bearing face extending radially outward of the recess, and a full thread formed on the shank and extending towards the head as far as the transverse plane defined by the annular bearing surface, the unthreaded portion of the shank extending between the terminal end of the thread and the bottom of the recess being substantially cylindrical and having a diameter less than the crest diameter of the thread but greater than the root diameter of the thread and substantially equal to the pitch diameter thereof, whereby rotation of the screw relative to the sheets will extrude their entire marginal portions completely into the recessed portion of the head beyond the full thread on the shank to lock the screw rotatably in both sheets.

6. A self-tapping screw in accordance with claim 5, in which the area of the annular bearing surface on the underside of the head is less than the projected area of the adjacent recess.

References Cited by the Examiner
UNITED STATES PATENTS

| | | | |
|---|---|---|---|
| 1,046,536 | 12/1912 | Bambeck | 85—46 |
| 2,076,041 | 4/1937 | Payne | 85—9 |
| 2,172,258 | 9/1939 | Place | 85—46 |
| 2,346,835 | 4/1944 | Green | 85—46 |
| 2,353,030 | 7/1944 | Green | 85—46 |
| 2,752,814 | 7/1956 | Iaia | 85—9 |
| 3,073,207 | 1/1963 | Lovisek | 85—48 |
| 3,124,408 | 3/1964 | Oestereicher | 85—47 |

CARL W. TOMLIN, *Primary Examiner.*

M. PARSONS, JR., *Assistant Examiner.*